No. 752,834.

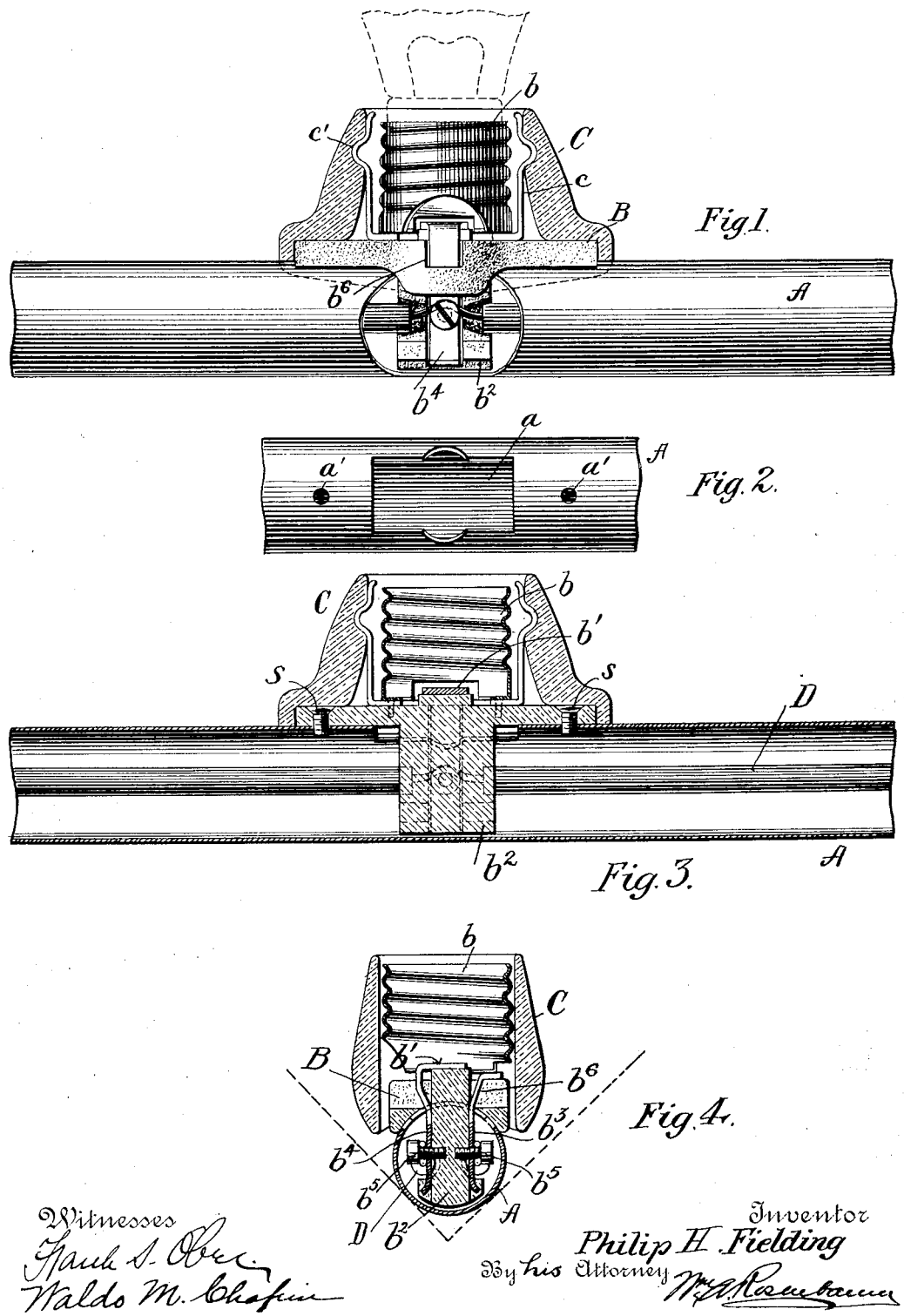

Patented February 23, 1904.

UNITED STATES PATENT OFFICE.

PHILIP H. FIELDING, OF NEW YORK, N. Y.,

ELECTRICAL RECEPTACLE.

SPECIFICATION forming part of Letters Patent No. 752,834, dated February 23, 1904.

Application filed June 27, 1903. Serial No. 163,350. (No model.)

*To all whom it may concern:*

Be it known that I, PHILIP H. FIELDING, a citizen of the United States, residing at the city of New York, in the borough of Manhattan and State of New York, have invented certain new and useful Improvements in Electrical Receptacles, of which the following is a full, clear, and exact description.

This invention relates to receptacles, rosettes, and similar electrical devices, the object being to provide an appliance of this character adapted to be attached directly to tubular conduits for electric wires and to be connected with the wires in said conduit without the necessity of severing the wires.

In the wiring of structures for electric lighting it is sometimes desirable to locate one or more lights in a corner or angle of the walls or partitions. For instance, in show-windows it is often required to place a row of lamps in the extreme corner of the window. In such locations the ordinary wiring-molding cannot conveniently be used, while the tubular conduits through which the wires are run can be readily placed in corners and secured against the converging surfaces. By providing a lamp-receptacle that can be attached directly to the front of such a tubular conduit the lamps can be located in corners without serious difficulty and the best position of the lamp obtained. The tubular conduit, however, may be placed against any flat surface or support or suspended in mid-air and still easily and conveniently carry my improved receptacles.

In carrying out my invention I provide a receptacle consisting of the base portion adapted to be secured by screws or otherwise to the outer surface of a tubular conduit, said base portion carrying on its outer face a suitable socket for an incandescent lamp or the binding-screws and fuses of an ordinary rosette and on its inner face having an integral projection adapted to pass through an opening in the wall of the conduit and carrying two binding-screws for connection with two wires running through the conduit. The complete device also includes a suitable cover adapted to inclose all metallic parts.

The invention will be described in detail with reference to the accompanying drawings, in which—

Figure 1 is a side elevation of an electrical conduit with a part broken away and having attached thereto one of my improved receptacles, the same being shown partially in elevation and partially in section. Fig. 2 is a plan of the conduit prepared to receive the receptacle. Fig. 3 is a longitudinal section of the conduit and receptacle, and Fig. 4 is a cross-section of the conduit and receptacle.

A indicates an ordinary tubular electrical conduit, which, as ordinarily constructed, consists of an exterior metal sheath having an interior insulating-lining, the latter not being shown in the drawings. This conduit, which is commonly placed inside of the walls of a building, may be used upon the surface thereof and is conveniently applied in corners. The receptacle which I have adapted for application to such a conduit consists of two main parts—a base B and a cover C. The base is an elongated body of porcelain or other suitable insulating material adapted to be placed longitudinally against the outer surface of the conduit, and for this purpose its bottom is curved from substantially the same center as the surface of the conduit. On its upper face at the center is attached a threaded cylinder or socket $b$ to receive the neck of an incandescent lamp, and at the center of the bottom of this socket is a metal plate $b'$, which, together with the socket, constitutes two terminals of the circuit. On the under side of the base there is an integral rectangular projection $b^2$, and on each side of this is a metal plate $b^3$ and $b^4$, respectively, held by screws $b^5$ and extending upward along the face of the projection through openings $b^6$ in the base and connected either integrally or otherwise with the socket $b$ and contact-plate $b'$, respectively. The screws $b^5$ serve at the same time as binding-screws for the wires, as will hereinafter appear. The extremities of the base are perforated for screws $s$, which are intended to hold the receptacle firmly to the conduit. The cover C is shaped to entirely inclose the exposed part of the base and the metallic parts attached thereto, and it is held in place upon the base by means of spring-tongues c, which are fastened to the base by the same screws or rivets that hold the socket b and have curved ends, which enter notches c' on the inside of the cover, and thus hold the latter frictionally in place.

The conduit is prepared to receive the receptacle by cutting away a segment of its wall, such a segment being of substantially rectangular shape, the opening formed by the removal thereof being indicated at a. This segment may be quickly removed by means of a file, as the wall of the conduit is usually thin. Two other holes a' are made in the conduit and tapped to receive the screws s. To apply the receptacle to the conduit, the insulating-conductors D are by means of a suitable hooked instrument drawn through the opening a and a small portion of the insulation removed therefrom. The base-wire of one conductor is then passed behind the head of one of the screws $b^5$ and clamped against the plate $b^3$, while the bare portion of the other wire is similarly clamped to the plate $b^4$. The wires are then drawn taut in the conduit and the projection $b^2$ of the receptacle at the same time passed into the opening a. The base is then firmly secured by the screws s and the cover C slipped over and caught by the tongues c. When a length of the conduit is thus equipped with one or more of the receptacles, it will be seen that it can be readily placed directly in a corner, so that the lamp will stand out midway between the two walls, as indicated with reference to the two diverging dotted lines in Fig. 4.

It is obvious that the outer face of the base may carry the usual metal plates, screws, and fuses of a rosette and that the cover may have a central contracted opening to admit a flexible cord for connection to such parts. My invention also comprehends an appliance of this general character having a rearward extension carrying the binding-screws adapted to reach through an opening in any surface to which the appliance is attached and for which purpose the bottom of the base may be either curved or flat, as required.

Having described my invention, I claim—

The combination with a closed tubular electrical conduit having an opening in its wall, of an electrical appliance consisting of a base adapted to be attached to the exterior of said conduit and to cover said opening and having a projection carrying binding-screws adapted to enter the opening in said conduit, insulated conductors in said conduit adapted to be engaged by said screws, and electric terminals carried by said base and connected respectively with said binding-screws.

In witness whereof I subscribe my signature in presence of two witnesses.

PHILIP H. FIELDING.

Witnesses:
FRANK S. OBER,
WALDO M. CHAPIN.